(12) United States Patent
Cadena

(10) Patent No.: US 6,393,885 B1
(45) Date of Patent: May 28, 2002

(54) TOOLING FOR DEEP ROLLING FILLETS OF CRANKSHAFT JOURNALS

(75) Inventor: Luis Cadena, Rochester, MI (US)

(73) Assignee: Hegenscheidt MFD Corporation, Sterling Heights, MI (US)

( * ) Notice: Subject to any disclaimer, the term of this patent is extended or adjusted under 35 U.S.C. 154(b) by 0 days.

(21) Appl. No.: 09/707,449

(22) Filed: Nov. 7, 2000

(51) Int. Cl.7 .............................................. B21D 15/00
(52) U.S. Cl. .......................................... 72/110; 72/107
(58) Field of Search .................... 72/107, 110; 29/6.01, 29/888.08

(56) References Cited

U.S. PATENT DOCUMENTS

| | | | |
|---|---|---|---|
| 4,559,798 A | * 12/1985 | Hayashi et al. ................ | 72/110 |
| 5,445,003 A | 8/1995 | Gottschalk et al. | |
| 5,943,893 A | * 8/1999 | Goedderz et al. ............. | 72/110 |
| 6,253,590 B1 | * 7/2001 | Lonero et al. ................ | 72/110 |
| 6,272,896 B1 | * 8/2001 | Ho ............................... | 72/110 |

FOREIGN PATENT DOCUMENTS

| | | | | |
|---|---|---|---|---|
| JP | 59-10433 | * 1/1984 | .................. | 72/110 |
| JP | 59-101228 | * 6/1984 | .................. | 72/110 |
| JP | 9-47960 | * 2/1997 | .................. | 72/110 |

* cited by examiner

Primary Examiner—Ed Tolan
(74) Attorney, Agent, or Firm—Carlson, Gaskey & Olds

(57) ABSTRACT

A rolling tool for deep rolling fillets of crankshaft journals is provided. The rolling force is divided and spread by the back up roller and directed onto the laterally spaced side shoulders of the workpiece roller. The fillet rolling forces are then recombined and directed into the fillet by the workpiece rollers which works and compressively stresses the fillets of the pin journals. With the rolling force between the backup rollers divided, there is reduced workpiece roller wear as compared to prior art backup roller designs.

4 Claims, 6 Drawing Sheets

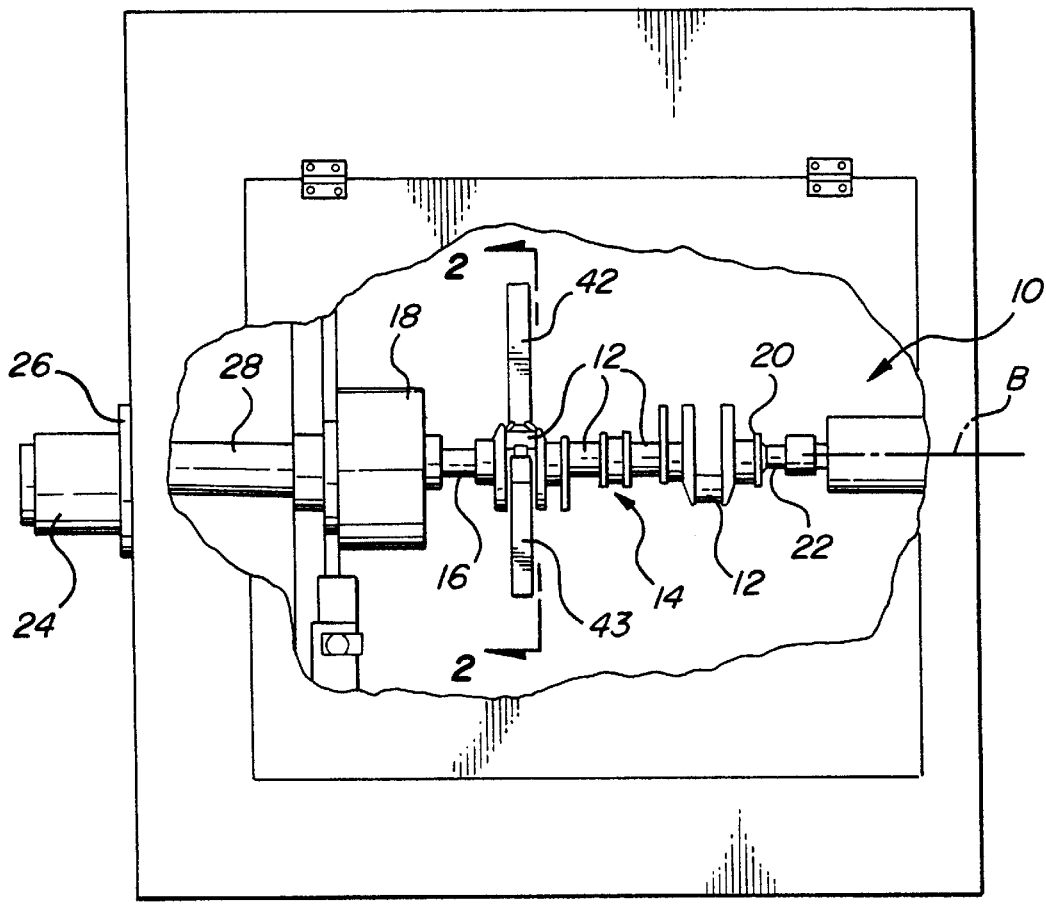
FIG-1
PRIOR ART
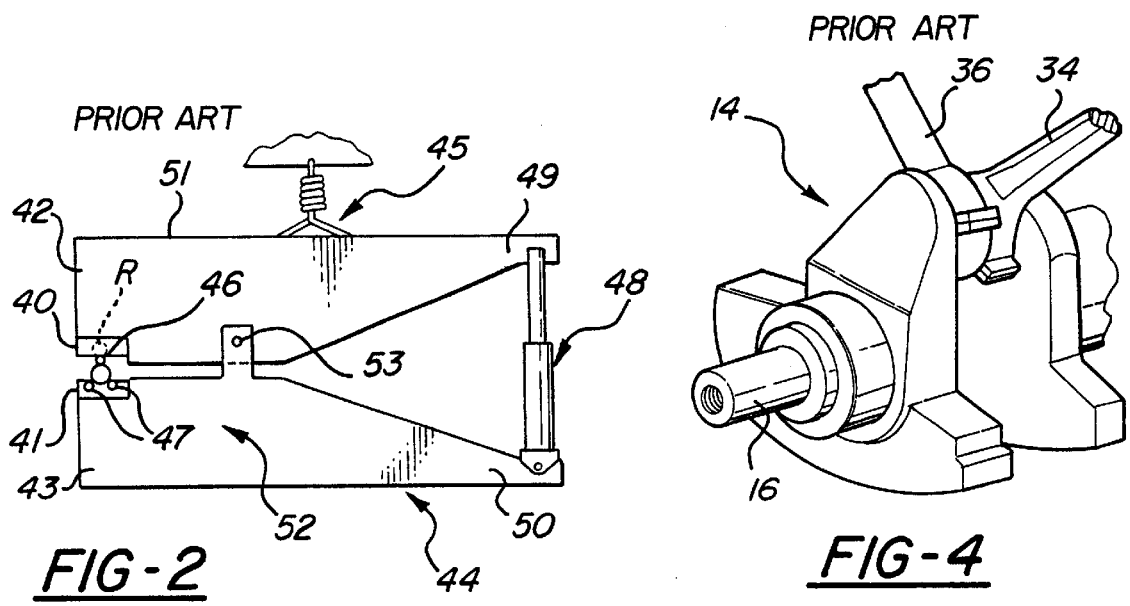
FIG-2
PRIOR ART
FIG-4
PRIOR ART

TOOLING FOR DEEP ROLLING FILLETS OF CRANKSHAFT JOURNALS

This invention relates to engine crankshaft machining for improving quality and fatigue life thereof and more particularly to new and improved work piece and back up roller constructions for deep rolling and strengthening the fillets of crank journals of crankshafts.

During deep rolling of the fillets defined by the annular undercuts of engine crankshaft journals, the fillet rollers experience high loads and mechanical wear from the back up rollers of the deep rolling machine. More particularly the back up roller imparts the large rolling loads directly onto the circumferential rolling edge of the fillet rollers as the crankshaft is turned in the machine and the fillet rollers impart deep compressive stresses in the fillets. The large loads directed onto small contact areas of the rolling edge of the fillet rollers by the back up roller effect fillet roller wear which materially reduces the service life of the fillet rollers and productivity of fillet rolling equipment.

This invention effectively increases the contact area between the back up roller and the workpiece or fillet roller so that the fillet roller loading is spread and fillet roller wear is resultantly reduced and tool life of the fillet roller is increased. More particularly by dividing the back up roller load so that it is directed to opposite sides of the annular working edge of the fillet roller, the rolling edge thereof experiences reduce wear so that fillet rollers, and deep rolling equipment life is increased. With this invention the rolling loads directed by the back up roller to the fillet rollers are on opposite sides of the rolling edge of the fillet roller so that fillet roller stability is improved during the deep rolling cycle.

This invention is particularly useful in increasing service life on a wide range of workpiece rollers and including those having a compound rolling radius to effect the optimized deep rolling of pin journals having undercuts with compound radii to increase the effective width of such journals.

It is accordingly a feature, object and advantage of this invention to increase the tool life of the work piece rollers of fillet rolling machines regardless of the undercut configuration. This invention provides a clear advantage over prior work piece rollers because of extended tool life resulting from the division and spreading of the rolling force over at least two discrete areas of the work piece roller and away from the rolling annular edge thereof.

BRIEF DESCRIPTION OF THE DRAWINGS

FIG. 1 is a schematic front view of a rolling machine for deep rolling the fillets of the crank pins journals of an engine crankshaft;

FIG. 2 is a schematic view of a portion of the machine of FIG. 1 taken generally along sight lines 2—2 of FIG. 1;

FIG. 4 is a pictorial view of a portion of a crankshaft with connecting rods mounted side-by-side on juxtapositioned crank pin journals;

BACKGROUND OF THE INVENTION

Figure 3:
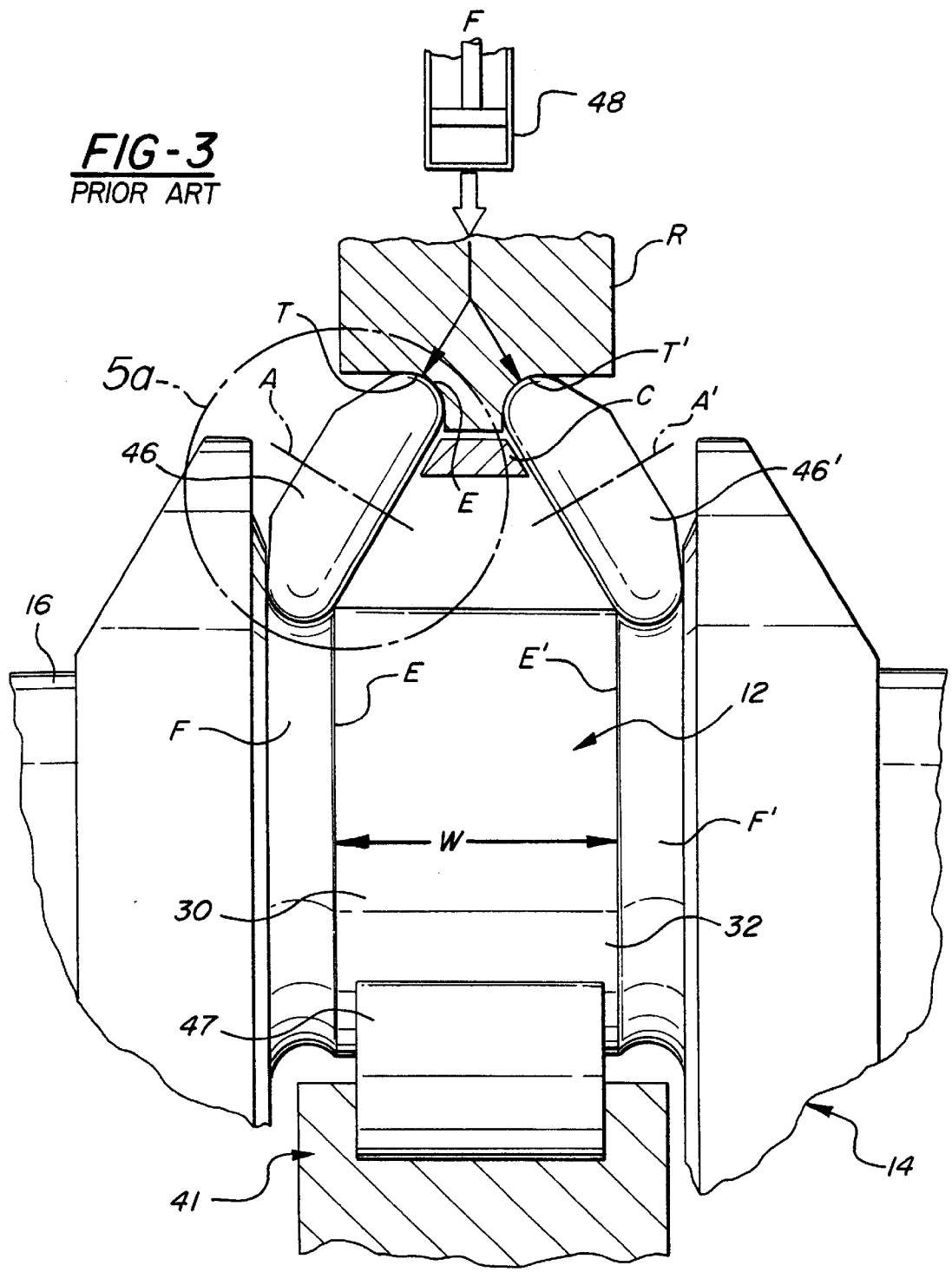
FIG. 3 is an enlarged view of the encircled portion of FIG. 1 showing tooling of the rolling machine deep rolling the fillets of a crank pin journal.

FIGS. 1 and 2 diagrammatically show portions of a metal working machine 10 illustrating some principals of deep roll strengthening of the fillets of crank pins 12 and main journals of a crankshaft 14 for an internal combustion engine. The crankshaft has a nose end 16 mounted in a chuck 18 and a flange end supported by a dead point center 22 of the machine. The crankshaft can be selectively and rotatably driven about horizontal axis B by a drive motor 24 supported by a mounting collar 26 on the machine housing and drivingly connected to the chuck by drive shaft 28. Each of the crank pins 12 is defined by side-by-side and coaxial journal portions 30 and 32 (FIG. 3) providing cylindrical bearings for the connecting rods 34, 36 (FIG. 4) of opposing pistons in the left and right cylinders of V-block engines.

In view of the fact that the pin journal portions 30, 32 experience high stress loads during engine operation, they are strengthened in various ways such as by deep roll hardening of their laterally spaced annular fillets F, F' in which high and concentrated rolling forces are directed to the undercuts or annular fillets areas of the crankshaft. Such rolling produces compressive strengthening stresses in the metal of the crankshaft fillets that may, for example, extend to a depth of 4 mm.

As diagrammatically illustrated in FIGS. 2 and 3, this is accomplished in the machine 10 by upper and lower tools 40 and 41 operatively mounted in the facing jaws 42, 43 of a load applying jaw assembly 44 forming a part of the machine and supported for operation by flexible support 45.

The upper tool 40 has a rotatable and generally cylindrical back up roller R having annular tracks T, T' operatively engaging a pair of floating workpiece rollers 46, 46' of hardened steel or other suitable material. The back up roller is rotatably mounted in the housing by suitable bearing such as disclosed in U.S. Pat. No. 5,445,003 issued Aug. 29, 1995 assigned to the assignee of this invention and hereby incorporated by reference. The workpiece rollers are operatively mounted in a cage C carried by the upper tool and generally turn on oppositely inclined axes A and A' to engage and deep roll the annular and laterally spaced undercuts or fillets F, F' providing the annular joint areas of the crankshaft journals such as the fillets, between the pins and the adjacent counter weights or bearing collars of the crankshaft. The annular working edge sections E of the rollers 46, 46' are designed to fit into the journal fillet F, F' and, for adequate penetration, the radius of the roller edge has generally been formed with a 180-degree arc. The actual size of the roller edge radius should be designed to lie within the machining tolerance for the crankshaft fillet. Good overall results are obtained when the radius of the roller edge approaches the radius of the fillet. The lower tool 41 has radially spaced support rollers 47 that provide the bearing and support for the crank pins as the crankshaft 14 is being rotatably driven about its axis B and the fillets F, F' are being deep rolled.

Rolling pressure is hydraulically applied by the expansion force of a hydraulic cylinder 48 operatively connected between the extending ends 49,50 of the upper and lower jaw arms 51, 52 pivoted together by a clevis mounted pivot 53 disposed at an intermediate position along the jaw arm lengths. This arrangement provides the mechanical advantage that amplifies the jaw closure force exerted to the jaw assembly by the expansion force of the hydraulic power cylinder 48. By virtue of the flexible support 45, the upper and lower jaws and their tools are supported to float around the axis of the orbiting crank pins during rolling. Rolling pressure, transmitted by the back up roller R, and exerted by the rollers 46, 46' can be increased and decreased by means of cylinder 48 during rotational drive of the crankshaft by motor 24 to impart concentrated annular residual stress patterns in the metal of the fillets F, F' which are among the most highly stressed cross-sectional areas of the crankshaft in engine operation. The amount of pressure as well as the number of over rolls of the fillets can be preselected to produce optimized fatigue strength.

Such rolling procedures, tooling and machinery satisfactory for many crankshafts deigns and meeting standards for improved crankshaft strengthening, limit the effective width of the crank pin journals such as width W of pin journal 12 defined by side-by-side cylindrical journal portions 30,32 of FIG. 3. To meet new engineering requirements and standards, a limited increase in effective width is needed. To provide such increase in the effective width of crank pin journals, work rollers with smaller and compound rolling radii of the annular working edge have been utilized to deep roll the annular undercuts machined with corresponding smaller annular radii.

Figure 5B:
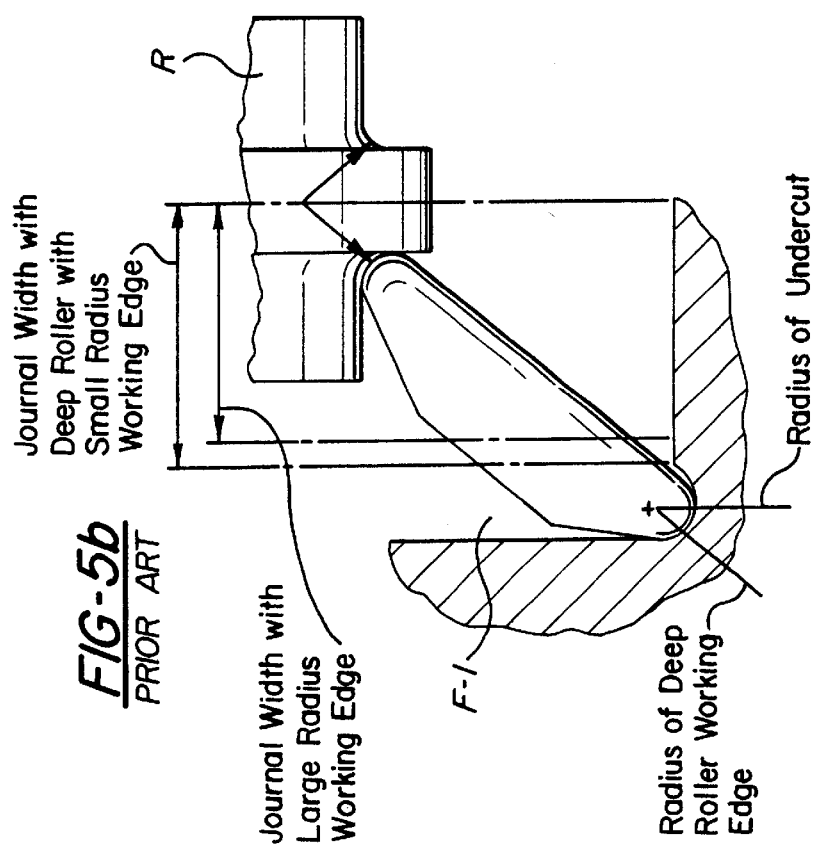
FIG. 5b is a view similar to FIG. 5a but illustrating another crankshaft and fillet roller for deep rolling the fillet of the illustrated crank pin.
Figure 5A:
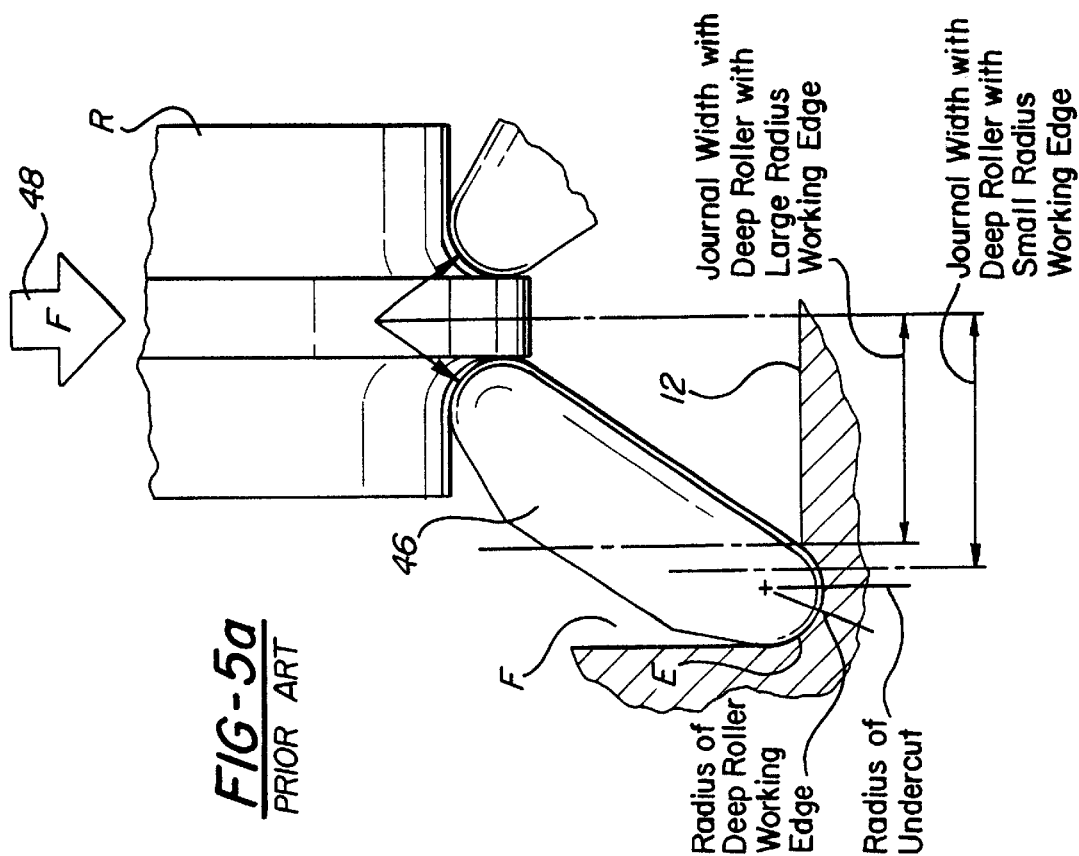
FIG. 5a is an enlarged view of a portion of FIG. 3.

FIG. 5a illustrates prior art deep rolling as in FIG. 3 wherein the radius of the undercut is R=2.286 mm and the working radius of the annular working edge E of deep roller 46 is R=2.180 mm. To increase the width of the pin journal, the radius of the undercut or fillet F-I is reduced to R=1.68 mm and the radius of the peripheral annular working edge of the roller is reduced to R=1.60 mm as illustrated in FIG. 5b. With such reduction in undercut and roller working edge radii, the desired increase in width of the journal is obtained. (Compare FIG. 5a and FIG. 5b). However, with the smaller radius of the roller working edge as used with roller of in FIG. 5b, the rolling force F from cylinder 48 is applied directly to the annular working edge of the working roller by the back up roller R. This force is further transmitted by the working roller into the annular fillet F-I which is cold worked and compressively stressed to increase fatigue life of the journal through the diameter of the work roller and the smaller roller edge. Such highly concentrated work loads, particularly those imparted to the smaller radiused working edge of the FIG. 5b work roller by the back up roller R, result in proportionally increased wear of the work rollers and sharply reduced work life thereof as discussed above. For example, with such modified work rollers, roller life is within the range of 200–500 pieces (2000 pieces at most) as compared to the regular standard of 5,000 pieces. This reduced roller work life is generally not acceptable for high volume production so new and improved tooling is needed.

DETAILED DESCRIPTION OF THE INVENTION

Figure 6:
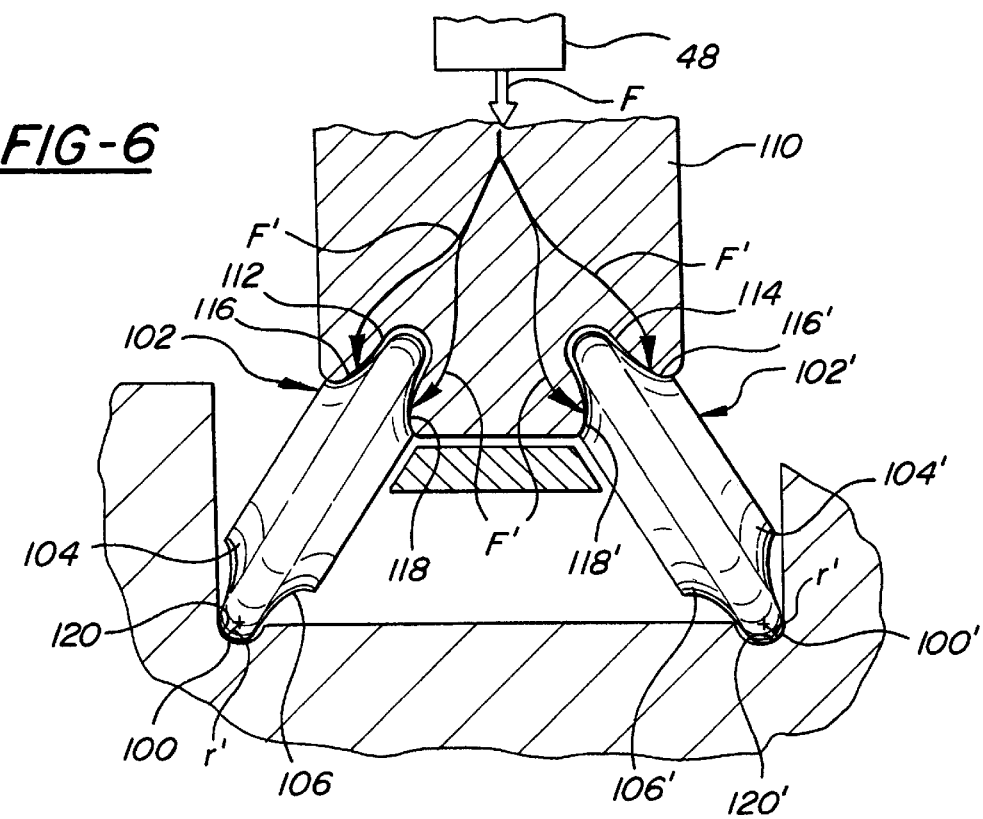
FIG. 6 is a sectional view with parts in full lines of one preferred embodiment of fillet rolling and fillet rolling tools according to this invention.
Figure 7:
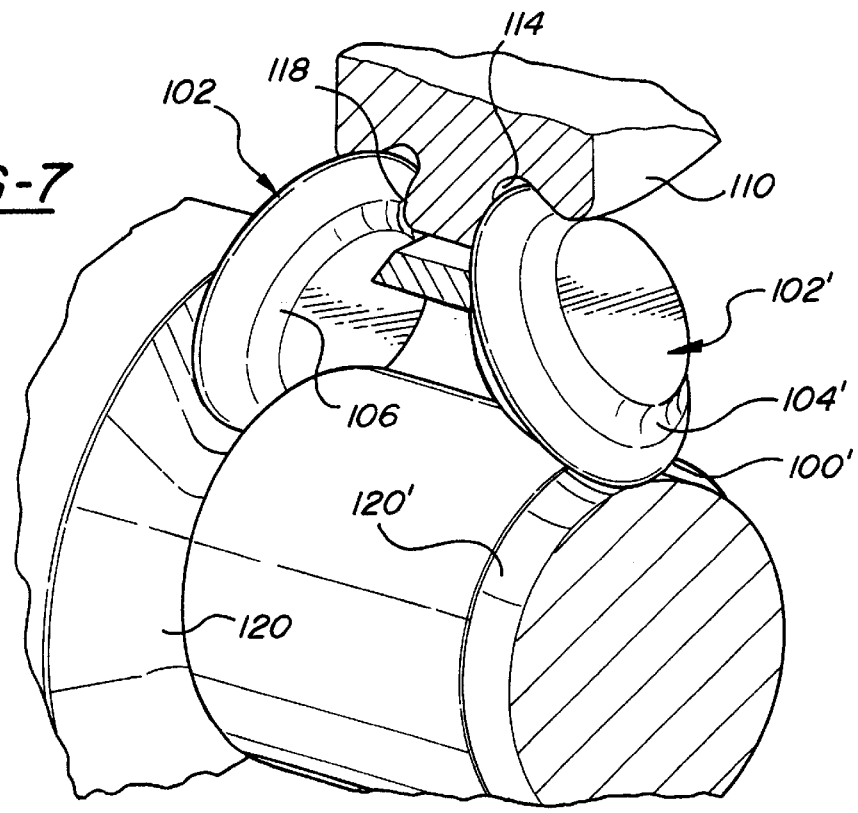
FIG. 7 is a pictorial view of the fillet rolling construction of FIG. 6.

FIGS. 6 and 7 illustrates one preferred embodiment of the present invention. As shown the annular working edges 100 and 100' of work rollers 102 and 102' respectively have small working radii, r' which may be 1.68 mm and equal to the small working radius of the annular working edge of the work roller of FIG. 5b to provide the desired increase in width of the pin journal as discussed above. However, the work life of work roller 102, 102' is materially increased by providing annular shoulders 104, 106 and 104' and 106' on opposite sides of the annular roller edges 100 and 100'. As illustrated the back up roller 110 has annular grooves or tracks 112 and 114 therein which receive with clearance the annular working edges 100 and 100' of the associated working rollers.

The load or rolling force F from the cylinder 48 is split by the annular contact shoulders 116, 118 and 116' and 118' of the back up roller 110 which respectively and rollingly contact the annular side shoulders 104, 106 and 104' and 106' of the two working rollers. As illustrated by force arrows F' in FIG. 6 the rolling loads are not directed onto the annular working edges of the workpiece rollers but are imparted to the shoulders on either side thereof. With this division and spread of load F applied to the working rollers by the back-up roller, there is materially increased working life of the back-up roller and more particularly of each of the workpiece roller 102, 102' in rolling fillets 120, 120'. This construction resultantly meets productivity requirements and can reach or exceed 5000 pieces.

Figure 8:
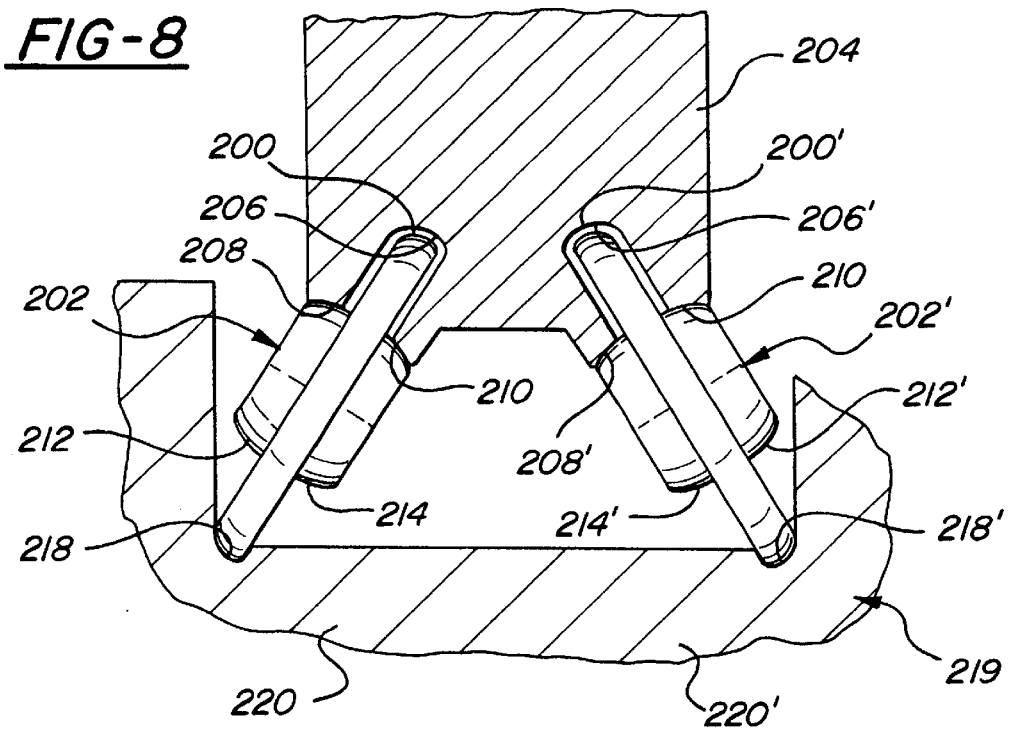
FIGS. 8 and 9 are views respectively similar to the views of FIG. 6 and 7 showing another preferred embodiment of this invention.
Figure 9:
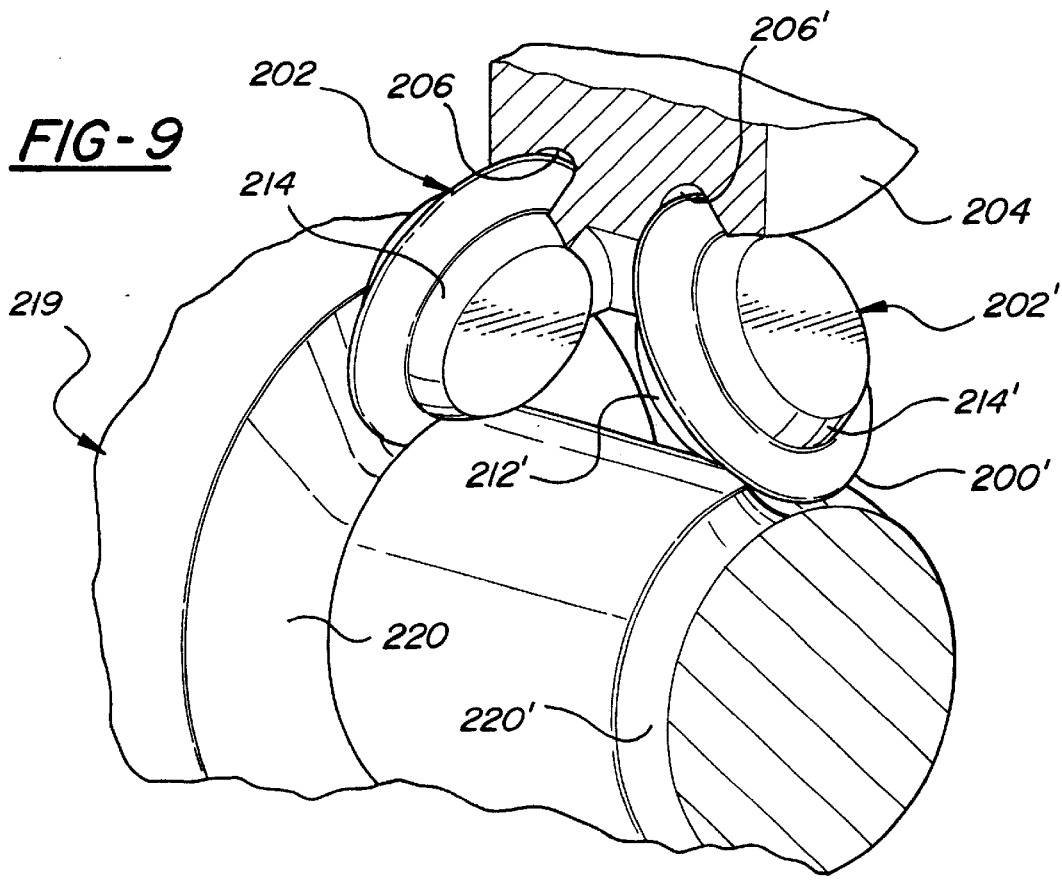
Figure 11:
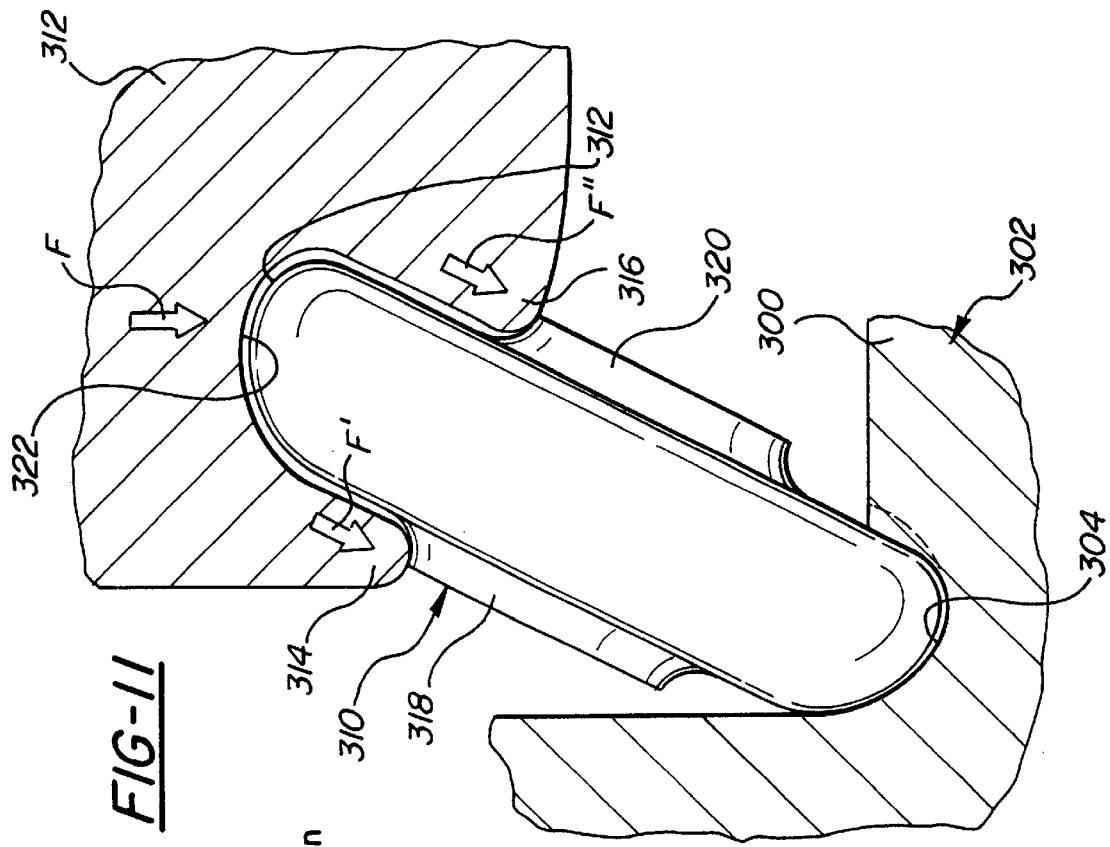
FIG. 11 is a cross sectional view similar to FIG. 10 but further illustrating the deep rolling the fillet of undercut with a workpiece roller illustrating still another preferred embodiment of the invention.

FIGS. 8 and 9 are views of another preferred embodiment of the present invention with the annular working edges 200 and 200' of work rollers 202 and 202' formed with variable radii. The back up roller 204 has annular grooves or tracks 206, 206' to receive with clearance the annular working edges 200, 200' of the working roller, the back-up roller is formed with spaced annular contact shoulders 208, 210 and 208' and 210' with inner annular contact surfaces to physically engage the hub-like annular contact shoulders 212, 214, 212', 214' formed on either side of the annular working edges 200, 200' of the working rollers.

With the variable radiused and smaller working edges, the undercuts or fillets 218, 218' of the pin journal of crankshaft 219 are deep rolled and the increased width of the side by side journals 220, 220' is obtained. Because the rolling loads between the back up and working rollers are removed from the annular working edges of the rollers and are divided and directed onto the side contact shoulders there is increased tool life of the fillet and the back up rollers.

Figure 10:
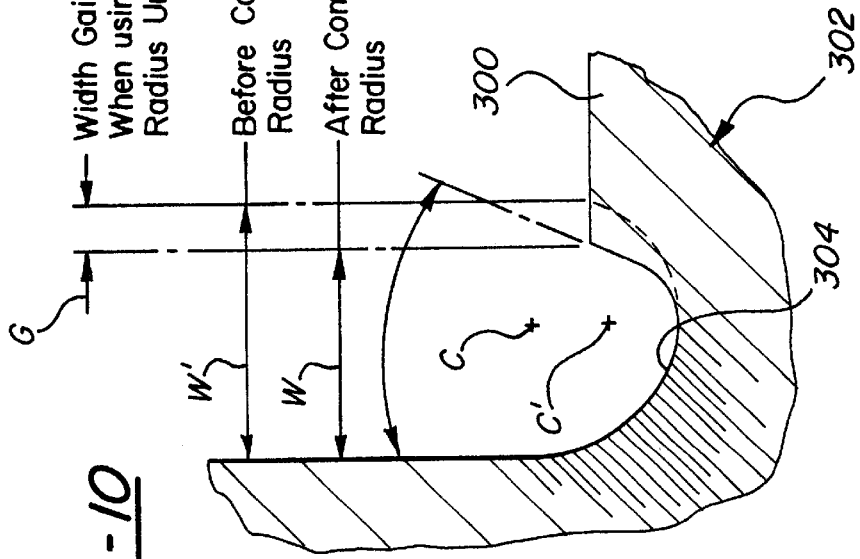
FIG. 10 is a cross sectional view of a portion of an engine crankshaft illustrating a pin journal undercut having a compound radius.

FIG. 10 illustrates the gain G in the width of pin journal 300 of crankshaft 302 by employing a compound radius for the annular undercut 304. The concave curved profile of the annular undercut 304 is shown in full lines with centers c and c'. For example, an undercut with the compound radii of 1.3000 and 0.6200 mm respectively provides an undercut width of 2.0447 mm. This provides a pin journal with gain G of 0.4332 mm over a normal undercut having only the center c and a single radius of 1.300 providing a larger undercut width w of 2.4779 mm. Since such fillets require deep rolling to increase strength, a work roller 310 having an annular rolling edge 312 with a compound curvature profiled to operatively fit within the annular undercut 304. As in the other embodiments of the present invention, the backup roller 312 of this embodiment has annular contact shoulders 314 and 316, which physically engage the annular side shoulders 318 and 320 of the workpiece roller 310. The backup roller 312 is furthermore provided with a centralized annular groove 322, which receives with clearance the annular working edge 312 of the workpiece roller.

With this invention, the rolling force F is divided and spread by the backup roller and directed onto the laterally spaced side shoulders of the workpiece roller as shown by force arrows F' and F". The fillet rolling force is then recombined and directed into the fillet by the workpiece rollers which works and compressively stresses the fillets of the pin journals. With the rolling force between the back up rollers divided, there is reduced workpiece roller wear as compared to prior work-back up roller designs.

The invention has been described in an illustrative manner, and it is to be understood that the terminology, which has been used, is intended to be in the nature of word of description rather than limitation.

Obviously, many modifications and variations of the present invention are possible in the light of the above teachings. It is, therefore, to be understood that within the scope of the appended claims the invention may be practiced otherwise than specifically described.

I claim:

1. A rolling tool for compressively rolling annular fillets of journals of a crankshaft for an internal combustion engine comprising a rotatable back-up roller having at least one annular and recessed track formed therein defined between spaced load transmitting annular shoulders, an annular workpiece roller of a predetermined diameter with an annular working edge having at least one predetermined radius and a pair of annular shoulders of a smaller diameter than the diameter of the annular working edge for rolling contact with the spaced shoulders of a back up roller for receiving rolling loads from the back up roller.

2. Fillet roller constructions for deep rolling the fillets of journals of engine crankshafts comprising a first annular roller for direct working engagement with the annular undercut defining the fillet formed between a journal and an adjacent counterweight, and an annular back up roller for direct operative engagement with the workpiece roller, said workpiece roller having an annular working edge of a predetermined diameter and a transversely curved working surface to operatively fit into the transverse curvature of the fillet, said working roller having shoulders on either side of said annular working edge, said back up roller having an annular groove therein for receiving said annular working edge of said workpiece roller, said workpiece roller having a pair of contact shoulders of a smaller diameter than the annular working edge of rolling contact on the spaced shoulders of said back up roller for receiving rolling loads from the back up roller.

3. Fillet roller tools for deep rolling the fillets of journals of engine crankshafts comprising a first annular roller for direct working engagement with the annular undercut defining the fillet formed between a journal and an adjacent counterweight and an annular back up roller for direct operative engagement with the workpiece roller, said workpiece roller having an annular working edge of a predetermined diameter and a transversely curved working surface profiled to operatively fit into the transverse curvature of the fillet, said workpiece roller further having an annular shoulder on opposite sides of said annular working edge, said back up roller having an annular groove therein for receiving with clearance said annular working edge of said workpiece roller and said back up roller having a pair of contact shoulders for contacting the annular shoulders on said workpiece roller so that a fillet rolling load applied to said back up roller is divided and spread to the workpiece roller through the annular shoulders thereof.

4. Deep rolling equipment for rolling the fillets of the pins of a crankshaft having a compound radius undercut comprising a work piece roller having an annular rolling edge with a compound radius rolling edge that operatively corresponds to the compound radius of the undercut, said equipment including a back up roller having an annular groove that receives with clearance the rolling edge and having a pair of annular work piece roller contact surfaces on either side of the annular groove therein that physically contact a pair of annular shoulders on opposite side of rolling edge of the work piece roller.

* * * * *